United States Patent [19]

Inui et al.

[11] Patent Number: 4,569,247
[45] Date of Patent: Feb. 11, 1986

[54] DETENT MECHANISM IN MANUAL TRANSMISSION

[75] Inventors: Masaki Inui; Yasuyoshi Yasui, both of Toyota, Japan

[73] Assignee: Toyota Jidosha Kabushiki Kaisha, Toyota, Japan

[21] Appl. No.: 450,009

[22] Filed: Dec. 15, 1982

[51] Int. Cl.$^4$ .................. G05G 5/10; G05G 5/06; G05G 9/12
[52] U.S. Cl. ............................... 74/475; 74/477
[58] Field of Search ................. 74/475, 477, 527

[56] References Cited

U.S. PATENT DOCUMENTS

| | | | |
|---|---|---|---|
| 2,521,312 | 9/1950 | Siekmann et al. | 74/475 X |
| 3,274,842 | 9/1966 | Huff | 74/477 X |
| 3,411,377 | 11/1968 | Golbeck | 74/527 |
| 3,677,096 | 7/1972 | Hatman | 74/527 |
| 4,070,914 | 1/1978 | Reinhardt et al. | 74/527 X |
| 4,476,738 | 10/1984 | Haga et al. | 74/475 |

FOREIGN PATENT DOCUMENTS 1680046  4/1972  Fed. Rep. of Germany ........ 74/475

Primary Examiner—Allan D. Herrmann
Attorney, Agent, or Firm—Oblon, Fisher, Spivak, McClelland & Maier

[57] ABSTRACT

A detent mechanism associated with a selector mechanism for change-speed gears in a manual transmission which includes a shift-and-select shaft axially slidably and rotatably assembled within a transmission housing and being linked with a manual shift lever to be axially moved in selecting operation of the shift lever and to be rotated in shifting operation of the shift lever. The detent mechanism comprises a casing rotatable on the shaft but axially fixed to the same, the casing being formed at its inner wall with a plurality of equiangularly spaced axial detent grooves in parallel with the axis of the shaft, a spring loaded follower element radially movable within a portion of the shaft and being selectively retained in the axial detent grooves of the casing under resilient load, and a guide pin secured to the transmission housing and being slidably engaged with an axial slot of the casing.

4 Claims, 7 Drawing Figures

DETENT MECHANISM IN MANUAL TRANSMISSION

BACKGROUND OF THE INVENTION

The present invention relates to a selector mechanism for change-speed gears in a manual transmission which includes a shift-and-select shaft linked with a manual shift lever to be axially moved in selecting operation of the shift lever and to be rotated in shifting operation of the shift lever, and more particularly to a detent mechanism associated with the selector mechanism to prevent unexpected rotary movement of the shaft in its neutral position or shifted position.

Such a conventional detent mechanism as described above includes, in general, a spring loaded follower element in the form of a ball or pin assembled within a portion of a transmission casing and a detent member integrally fixed to the shift-and-select shaft to receive the follower element thereon. The detent member is formed thereon with a plurality of equiangularly spaced axial detent grooves in which the follower element is selectively retained under resilient load to prevent rotary movement of the shaft in its neutral position or shifted position. Although it is advantageous that the detent mechanism can be installed in a relatively narrow space in the transmission casing there will occur large sliding resistance between the follower element and the axial detent grooves of the detent member during axial movement of the shaft in selecting operation of the manual shift lever, resulting in a worse in operational feel of the manual shift lever.

SUMMARY OF THE INVENTION

It is, therefore, a primary object of the present invention to provide an improved detent mechanism capable of effecting smooth axial movement of the shift-and-select shaft in selecting operation of the manual shift lever thereby to enhance operational feel of the shift lever.

According to the present invention there is provided a detent mechanism associated with a selector mechanism for change-speed gears in a manual transmission which includes a shaft axially slidably and rotatably assembled within a transmission casing and being linked with a manual shift lever to be axially moved in selecting operation of the shift lever and to be rotated in shifting operation of the shift lever. The detent mechanism comprises a casing assembly rotatable on the shaft but axially fixed to the same, the casing assembly being formed at its inner wall with a plurality of equiangularly spaced axial detent grooves in parallel with the axis of the shaft, a spring loaded follower element in the form of a ball or pin radially movable within a portion of the shaft and being selectively retained in the axial detent grooves of the casing assembly under resilient load, and guide means for guiding axial movement of the casing assembly and for restricting rotary movement of the casing assembly.

In another aspect of the present invention, the detent mechanism comprises a casing rotatable on the shaft but axially fixed to the same, an annular flange of the shaft rotatably coupled with the casing and being formed at its one end face with a plurality of equiangularly spaced radial detent grooves, a spring loaded follower element assembled within an axial bore in the wall structure of the casing and being selectively retained in the detent grooves of the flange, and guide means for guiding axial movement of the casing and for restricting rotary movement of the casing.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
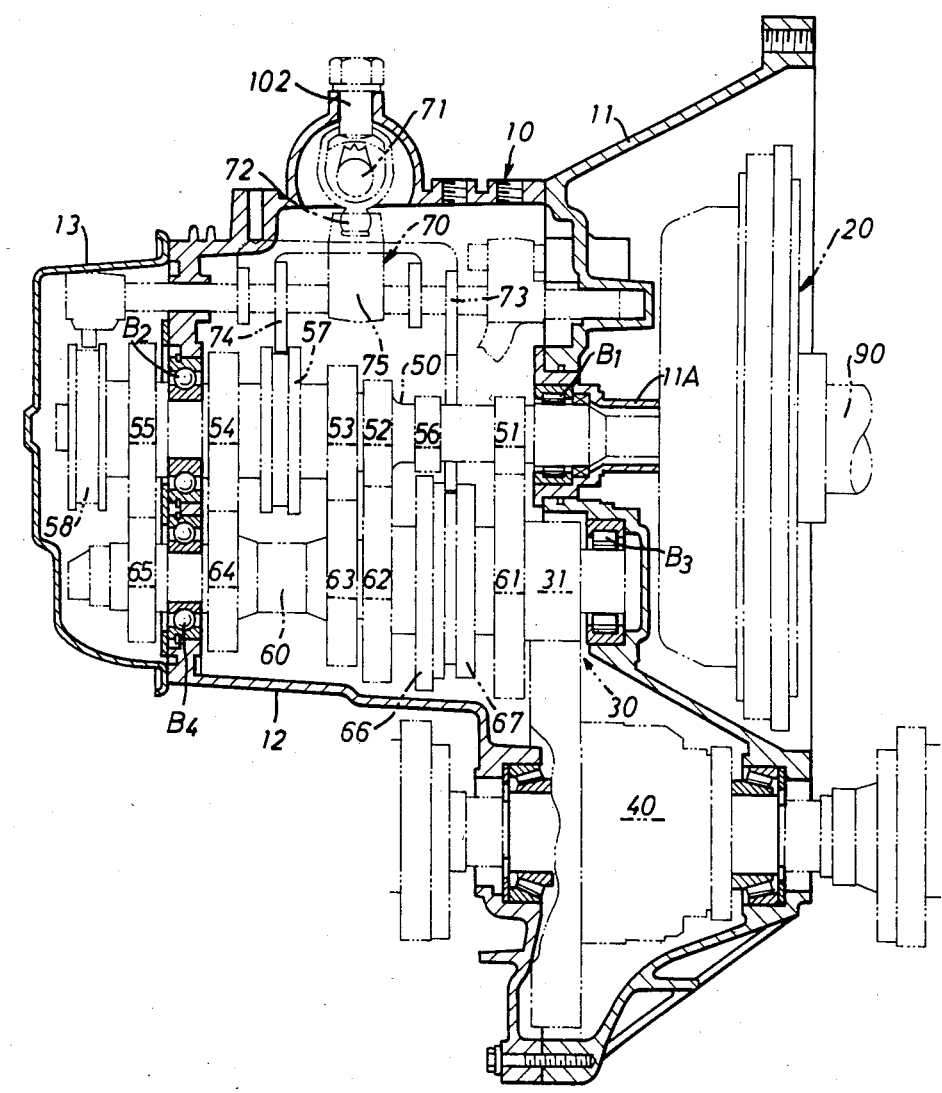
FIG. 1 illustrates an arrangement of a selector mechanism for change-speed gears in a manual transmission.
Figure 2:
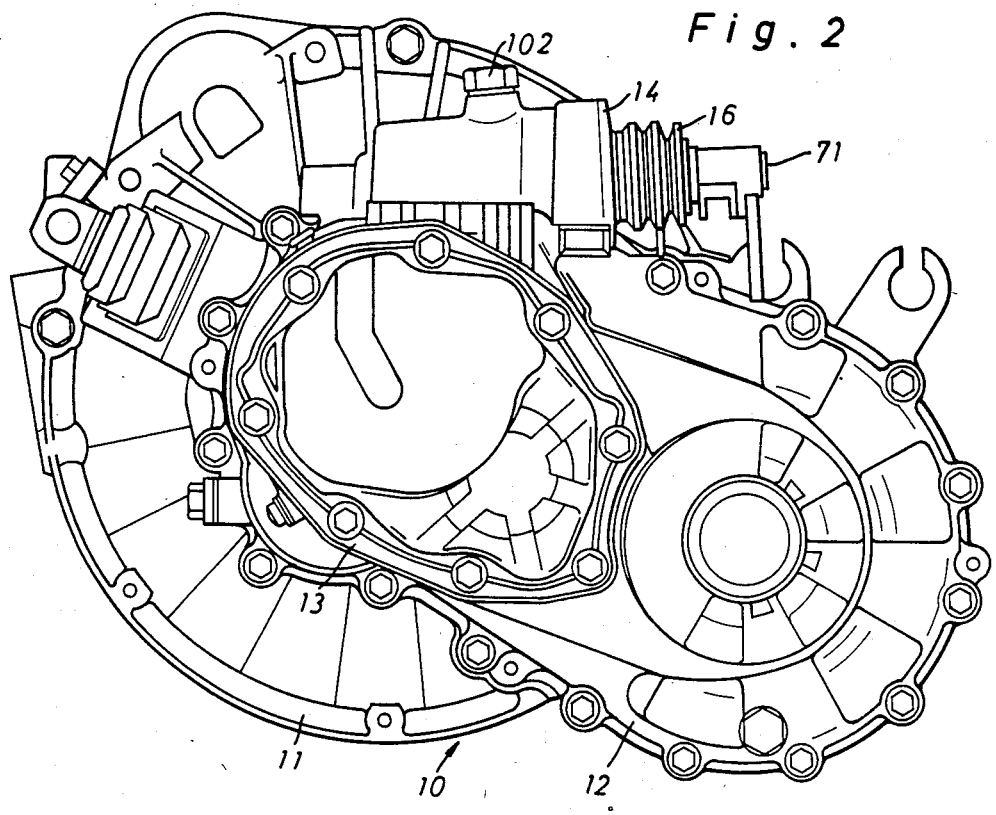
FIG. 2 is a front view of the manual transmission shown in FIG. 1.

Referring now to the drawings, particularly in FIGS. 1 and 2, there is illustrated an arrangement of a selector mechanism 70 for change-speed gears in a manual transmission which includes a housing assembly 10 composed of a trans-axle casing 11, a transmission casing 12 and a cover plate 13. The trans-axle casing 11 is arranged to be secured at its right end seating face to a cylinder block of an internal combustion engine of the transversely mounting type, which casing 11 contains therein a clutch assembly 20 in connection to a crankshaft 90 of the engine. The transmission casing 12 is secured at its right end seating face to trans-axle casing 11 in a fluid-tight manner and carries thereon a final drive gearing 30 and a differential gear unit 40 which are located adjacent the lower portion of clutch assembly 20. The left end of transmission casing 12 is sealingly closed by the cover plate 13 to store lubricating oil within the housing assembly 10.

Assembled within the housing assembly 10 is an input shaft 50 which is arranged coaxially with an output member of clutch assembly 20 and in parallel with an output shaft 60. The input shaft 50 is supported by a pair of axially spaced bearings $B_1$ and $B_2$ respectively from trans-axle casing 11 and transmission casing 12, which input shaft 50 is provided thereon with first to fifth speed driving gears 51–55, a reverse driving gear 56, and change-over sleeves 57, 58 respectively for 3–4 speeds and 5 speed. The bearing $B_1$ is fixed in place by a bearing retainer 11A. The output shaft 60 is supported by a pair of axially spaced bearings $B_3$ and $B_4$ respectively from trans-axle casing 11 and transmission casing 12, which output shaft 60 is provided thereon with first to fifth speed driven gears 61–65, a reverse driven gear 66 and a change-over sleeve 67 for 1–2 speeds. The output shaft 60 is further provided thereon with a pinion 31 of the final drive gearing 30.

Assembled within the upper portion of transmission casing 12 is a shift-and-select shaft 71 of the selector mechanism 70 for effecting selection of gear ratios between output and input shafts 50 and 60. As can be well seen in FIG. 3, the shift-and-select shaft 71 is integrally provided thereon with an inner lever member 72 which is selectively brought into engagement with each head of shift forks 73, 74 and 75. The shift-and-select shaft 71 is rotatably and slidably supported from transmission casing 12 and from a cover member 14 threaded into housing 12 in a fluid-tight manner and extends outwardly through an oil seal member 15 and a dust boot 16. The outer end of shaft 71 is operatively connected through a shifting linkage (not shown) to a manual shift lever which is arranged to effect axial movement of the shaft 71 in its selecting operation and to effect rotary movement of the shaft 71 in its shifting operation. The shift-and-select shaft 71 is further provided thereon with a select return mechanism 80 and a detent mechanism 100.

The select return mechanism 80 acts to retain the manual shift lever in its neutral position, which mechanism 80 includes a pair of axially spaced snap rings 81, 82 fixed to shaft 71, a pair of axially spaced spring holders 83, 84 slidable on shaft 71, a pair of axially spaced compression coil springs 85, 86 in surrounding relationship with shaft 71, a stopper plate 87 slidable on shaft 71, and a reverse restrict lever 88. The reverse restrict lever 88 acts as a stopper for mechanism 80 and is also in the form of a component member in a conventional mechanism for preventing an error in shifting operation of the manual shift lever in the reverse direction. In such arrangement, the select return mechanism 80 acts to retain the shift-and-select shaft 71 in its neutral position so as to maintain engagement of the inner lever member 72 with the head of shift fork 74 for change-over between 3-4 speeds.

Figures 3, 4:
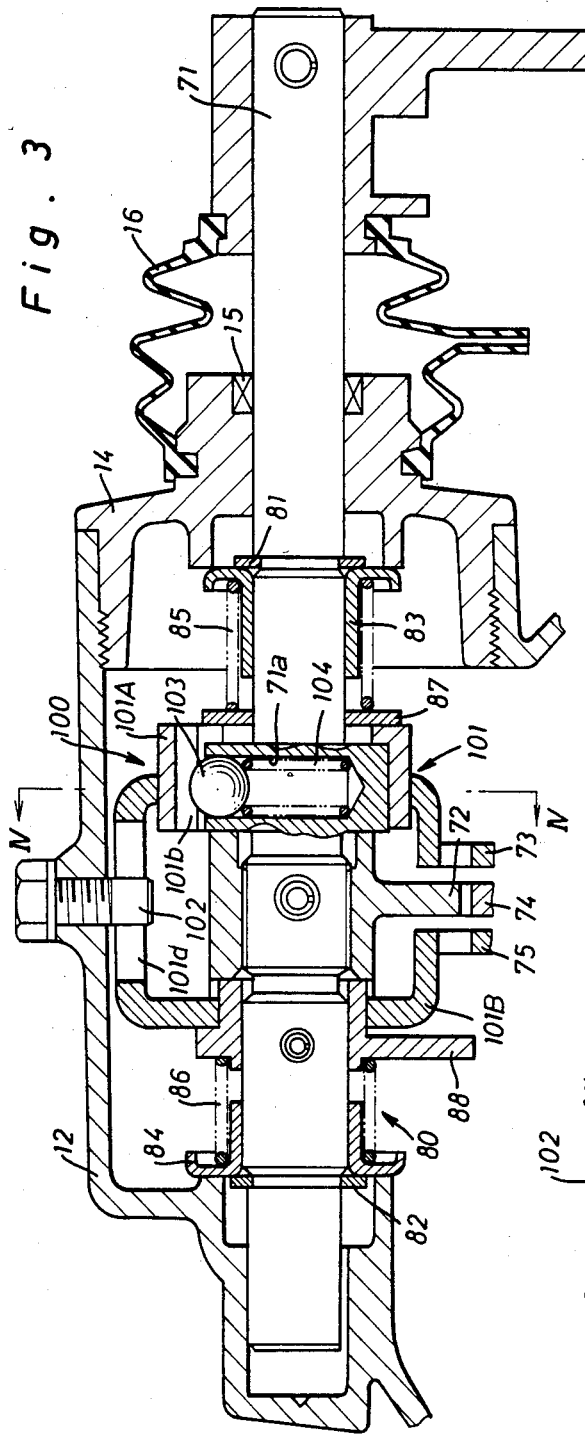
FIG. 3 is an enlarged sectional view illustrating a detent mechanism associated with the selector mechanism.
FIG. 4 is a cross-sectional view taken along line IV—IV in FIG. 3.

As can be well seen in FIGS. 3 and 4, the detent mechanism 100 includes a casing assembly 101 rotatable on shaft 71 but axially fixed to the same, a guide pin 102 threaded into transmission casing 12 for guiding axial movement of the casing assembly 101, a metallic detent ball 103 rotatably contained within a radial bore 71a in an enlarged portion of shaft 71, and a compression coil spring 104 assembled within the radial bore 71a for biasing the ball 103 upwardly. The casing assembly 101 is composed of an inner casing 101A rotatably mounted on shaft 71 and an outer casing 101B coupled over the inner casing 101A in its one side wall. The head portion of inner casing 101A is formed at its inner wall with equiangularly spaced axial detent grooves 101a, 101b, 101c in which the ball 103 is selectively retained under load of spring 104. The outer casing 101B is formed at its head portion with an axial slot 101d in which the inner end of guide pin 102 extends to restrict rotary movement of the casing assembly 101. The axial detent grooves 101a-101c and the axial slot 101d are arranged in parallel with the axis of shaft 71.

In such arrangement as described above, the shift-and-select shaft 71 is moved rightwards against the biasing force of spring 85 in selecting operation of the manual shift lever toward the first or second speed position. As a result, the inner lever member 72 is brought into engagement with the head of shift fork 73 for 1-2 speeds, and the stopper plate 87 abuts against the left end of spring holder 83 under load of spring 86. In selecting operation of the manual shift lever toward the fifth speed position or the reverse position, the shift-and-select shaft 71 is moved leftwards against the biasing force of spring 86 to effect engagement of the inner lever member 72 with the head of shift fork 75 for 5 speed—reverse drive and to cause abutment of the reverse restrict lever 88 against the right end of spring holder 84. During such selecting operation of the manual shift lever as described above, the casing assembly 101, the detent ball 103 and the spring 104 are moved unitedly with shift 71 under a slight sliding resistance between the guide pin 102 and the axial slot 101d of the outer casing 101B. This serves to enhance operational feel of the manual shift lever in the selecting operation.

When the manual shift lever is shifted to either one of the first, third and fifth speed positions under engagement of the inner lever member 72 with the selected shift fork 73, 74 or 75, the shift-and-select shaft 71 and the inner lever member 72 are rotated counterclockwisely to cause rightward movement of the selected shift fork in FIG. 1. This results in rightward movement of either one of the changeover sleeves 67, 57 and 58 to complete either one of the first, third and fifth speed gear trains. When the manual shift lever is shifted to either one of the second, fourth and reverse positions under engagement of the inner lever member 72 with the selected shift fork 73, 74 or 75, the shift-and-select shaft 71 and the inner lever member 72 are rotated clockwisely to cause leftward movement of the selected shift fork in FIG. 1. This results in leftward movement of either one of the change-over sleeves 67, 57 and a reverse idler gear to complete either one of the second and fourth speed gear trains and the reverse gear train. During such shifting operation of the manual shift lever, the detent ball 103 and the spring 104 are rotated unitedly with shaft 71, and the guide pin 102 acts to restrict rotary movement of the casing assembly 101. As a result, the detent ball 103 disengages from the intermediate detent groove 101b and is brought into engagement with the detent groove 101a or 101c. This serves to prevent unexpected disengagement of the shifted gear and to enhance operational feel of the manual shift lever in its shifting operation.

Figure 5:
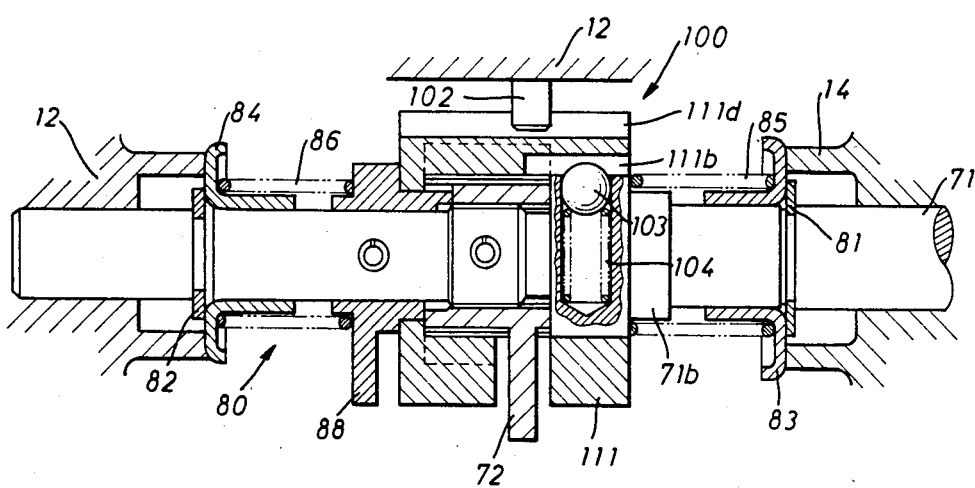
FIG. 5 is an enlarged sectional view of a modification of the detent mechanism of FIG. 3.
Figure 6:
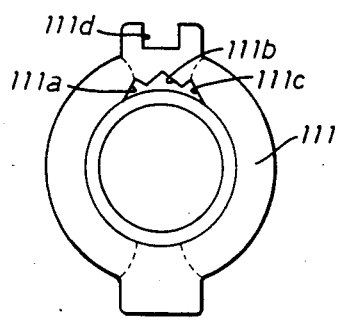
FIG. 6 is a front view of a casing for the detent mechanism shown in FIG. 5.

In FIGS. 5 and 6 there is illustrated a modification of the above embodiment in which the casing assembly 101 for the detent mechanism 100 is replaced with a single casing 111, and the stopper plate 87 for the select return mechanism 80 is replaced with a stepped portion 71b of shaft 71. In this modification, the head portion of casing 111 is formed with an axial groove 111d in which the inner end of guide pin 102 extends to restrict rotary movement of the casing 111. The head portion of casing 111 is also formed at its inner wall with equiangularly spaced axial detent grooves 111a, 111b and 111c in which the ball 103 is selectively retained under load of spring 104. The other component parts and portions are substantially the same as those in the above embodiment.

Figure 7:
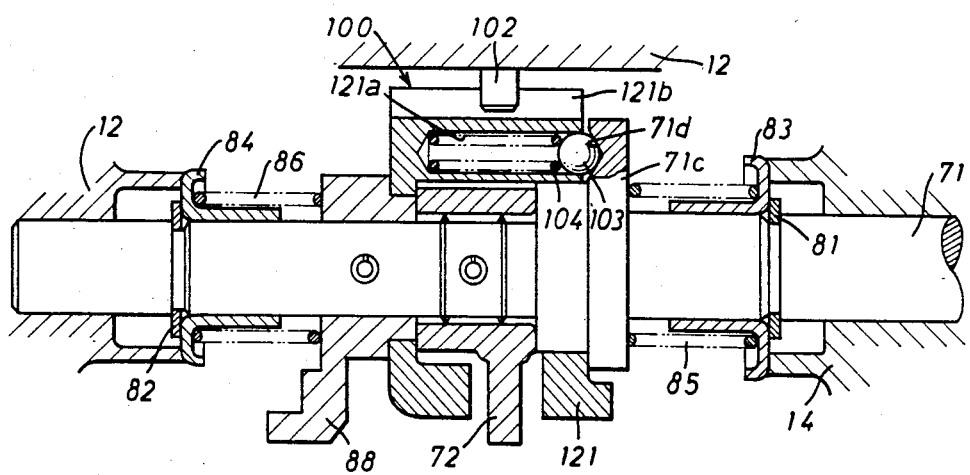
FIG. 7 is an enlarged sectional view of another modification of the detent mechanism of FIG. 3.

In FIG. 7 there is illustrated another modification of the above embodiment in which the casing assembly 101 for the detent mechanism 100 is replaced with a single casing 121 rotatable on shaft 71 but axially fixed to the same. In this modification, the casing 121 is formed in its head portion with an axial bore 121a in which the ball 103 is rotatably contained and received by the spring 104. The head portion of casing 121 is also formed with an axial groove 121b in which the inner end of guide pin 102 extends to restrict rotary movement of the casing 121. The select-and-shift shaft 71 is integrally formed with an annular stepped flange 71c which is rotatably coupled with the casing 121. The flange 71c of shaft 71 is formed at its left end face with three equiangularly spaced radial detent grooves one of which is illustrated by the reference numeral 71d. In such arrangement, the detent ball 103 is retained in the detent groove 71d under load of spring 104 to restrict rotary movement of the shaft 71 in its shifted position. The other component parts and portions are substantially the same as those in the above embodiment.

It is further noted that in the actual practices of the present invention the guide pin 102 for the detent mechanism 100 may be fixed to the head portion of the casing 111 or 121. In such a case, the axial groove 111d or 121b is formed in the inner wall of transmission casing 12. Alternatively, the detent ball 103 may be replaced with an propriate detent pin.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A detent mechanism associated with a selector mechanism for change-speed gears in a manual transmission which includes a shaft axially slidably and rotatably mounted within a transmission housing and being linked with a manual shift lever to be axially moved in selecting operation of said shift lever and to be rotated in shifting operation of said shift lever, said detent mechanism comprising:

a radial bore formed in a portion of said shaft;
   a casing assembly comprising an outer casing rotatable on said shaft but axially fixed to the same, and an inner casing coupled within said outer casing and rotatably supported on said shaft, said inner casing being formed at its inner wall with a plurality of equiangularly spaced axial detent grooves in parallel with the axis of said shaft;
   spring loaded follower means comprising a detent ball rotatably contained within said radial bore and a spring mounted within said radial bore for biasing said ball toward said detent grooves for selective retention therein; and
   guide means for guiding axial movement of said casing assembly and for restricting rotary movement of said casing assembly, said guide means comprising an axial slot formed in the outer periphery of said outer casing, parallel with the axis of said shaft, and a guide pin secured to said transmission housing and slidable in engagement with said axial slot of said outer casing.

2. A detent mechanism as claimed in claim 1, wherein said shaft is integrally provided thereon with an inner lever member which is fixed to said shaft and arranged within said casing assembly to be selectively brought into engagement with a plurality of shift forks of said manual transmission.

3. A detent mechanism as claimed in claim 1, further comprising a pair of compression coil springs arranged in surrounding relationship with said shaft for resiliently biasing said casing assembly toward a neutral position.

4. A detent mechanism associated with a selector mechanism for change-speed gears in a manual transmission which includes a shaft axially slidably and rotatably mounted within a transmission housing and being linked with a manual shift lever to be axially moved in selecting operation of said shift lever and to be rotated in shifting operation of said shift lever, said detent mechanism comprising:

a radial bore formed in a portion of said shaft;
   a casing assembly comprising an outer casing rotatable on said shaft but axially fixed to the same, and an inner casing coupled within said outer casing and rotatably supported on said shaft, said inner casing being formed at its inner wall with a plurality of equiangularly spaced axial detent grooves in parallel with the axis of said shaft;
   spring loaded follower means comprising a detent ball rotatably contained within said radial bore and a spring mounted within said radial bore for biasing said ball toward said detent grooves for selective retention therein, wherein said shaft is formed with an enlarged portion rotatably coupled within said inner casing, and wherein said radial bore containing said ball and said spring is formed in said enlarged portion of said shaft; and
   guide means guiding for axial movement of said casing assembly and for restricting rotary movement of said casing assembly, said guide means comprising an axial slot formed in the outer periphery of said outer casing, parallel with the axis of said shaft, and a guide pin secured to said transmission housing and slidable in engagement with said axial slot of said outer casing.

* * * * *